United States Patent Office 3,497,951
Patented Mar. 3, 1970

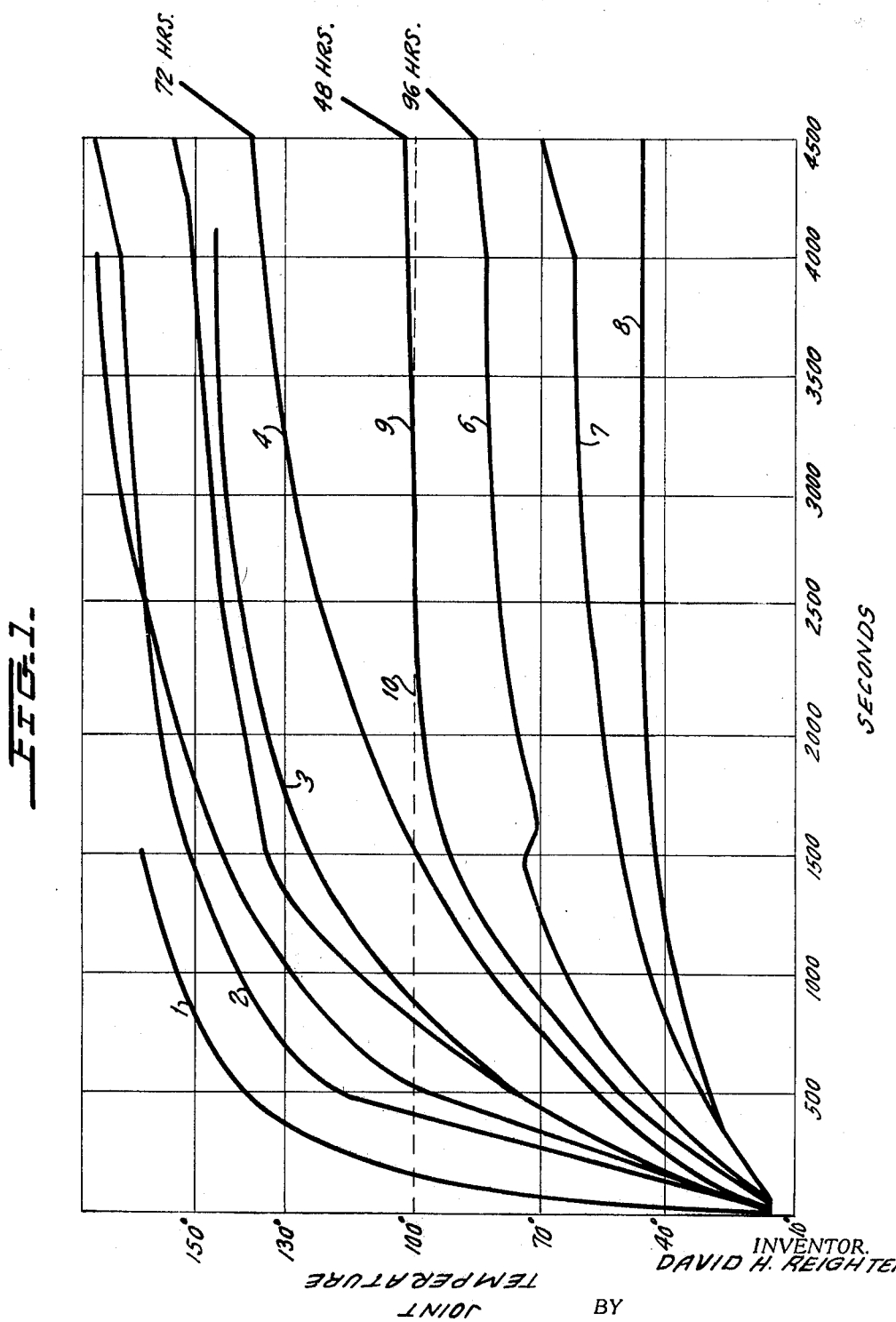

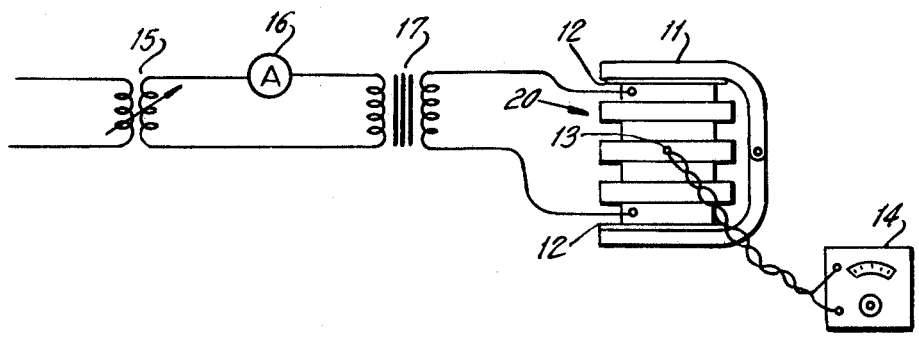

3,497,951
BUS-BAR JOINTS AND METHODS FOR PRODUCING THEM
David H. Reighter, Roslyn, Pa., assignor, by mesne assignments to I-T-E Imperial Corporation, Philadelphia, Pa., a corporation of Delaware
Filed Nov. 1, 1967, Ser. No. 679,806
Int. Cl. H01r 43/00
U.S. Cl. 29—628                                         3 Claims

ABSTRACT OF THE DISCLOSURE

Bus-bar ends which are later to be joined in a bus-bar assembly, are coated with a low melting solder. Upon assembly of the bus-bar system the pressure of adjacent bus-bars upon each other, caused by the assembling bolts, is sufficient to maintain electrical contact. Such a system, however, has a comparatively high resistance, and as the electrical load upon the bus-bar increases, the temperature of the joint is raised, causing the solder to melt thus producing a fused joint. This joint possesses the desirable characteristics of low electrical resistance, and low mechanical strength.

FIELD OF THE INVENTION

This invention relates to a method of providing good electrical contact between sections of electrical bus-runs.

DESCRIPTION OF THE PRIOR ART

In assembling electrical bus-runs, it is necessary to provide bus-bars which will carry a substantial load of current, without a great rise in temperature during operation and also to provide a simple method of joining the bus-bars to each other, in such a way that the bus-runs may be readily assembled and good electrical contact achieved between the bars. Since it is customary in this field of manufacture to assemble bus-runs for testing in the location of manufacture, followed by disassembly and reassembly in the field, it is necessary to provide a means of jointing wherein the joints are readily broken apart, but which at the same time exhibit all of the electrical characteristics of the finally assembled system.

Most of the bus-bars utilized in the industry are made of copper or aluminum.

The classical method of joining bus-bars has been to silverplate the area to be joined followed by the bolting together of the bus-bars. It is relatively simple to silverplate copper bars, however, the process of plating aluminum is a multi-stage procedure which does not always give rise to reliable results. In this process, known as the "zincate process," the aluminum bus-bar is coated with zinc, the zinc coating removed, a second zinc coating applied, upon which is laid a coating of copper, followed by a silverplating in the usual manner. Due to the rise in price of copper, it has been found desirable to make the bus-bars out of aluminum rather than copper, where such a proceeding is feasible within the general concept of the bus-bar system. Hence, a way has been sought to avoid the well-known problems of silver coating aluminum surface.

There are other problems associated with the silver coated system. Although silver-to-silver provides an excellent electrical conducting surface, such conductivity is only provided where the metals are in actual contact. Thus, it has been found that in a bus-bar joint, the desired silver-to-silver contact is not made over the entire area of the silver-to-silver interface of the contacting bus-bars, but only in the immediate area of the bolts joining the bus-bars where the pressure is in excess of that in other parts of the joint. Thus, since there is such a relatively small contact area carrying the electrical load of the bus-bar, the normal rises in temperature which are experienced in ordinary operation of bus-bars are considerably amplified in these local spots, giving rise to a deleterious effect upon the mechanical quality of the bus-bar joint which is reflected in an even greater deterioration of electrical conductivity, thus initiating a cycle of deterioration which, under high load operation conditions, may lead to the complete breakdown of the joint.

A second disadvantage of the silver coating is that under normal atmospheric conditions the silver will be tarnished by the formation of a thin film of silver sulfide. Since thin films of silver sulfide have substantially the same electrical conductivity as silver itself under most circumstances, this tarnish does not affect the operation of the joint. However, where the bus-bar system is installed in a location containing a high percentage of sulfur in the atmosphere, a situaton not at all uncommon in many chemical processes, the amount of sulfide formed by the atmosphere may reduce seriously the quality of the electrical contact within the joint.

Hence, it was found desirable to search for a means of joining bus-bars, by a different method, which would still meet the specifications of the NEMA for a silver surface or equivalent joint which does not have the problems associated with silver-to-silver joints, particularly silver-to-silver joints on aluminum backing, the NEMA standards being those accepted in the industry.

A method of providing an efficient connection for high density currents is disclosed in NASA Technical Brief No. 67–10140 published in May 1967, and available from the Clearing House for Federal Scientific and Technical Information, Springfield, Virginia 22151. In the method disclosed in this publication, electrical contact is provided between stainless steel tubing and a bus-bar by means of a lead solder film placed between the stainless steel tube and the bus-bar. Electrical contact is obtained by clamping the bus-bar upon the tube in such a manner that the lead solder film flows about the tube to produce an essentially 100% contact surface efficiency. This method, however, would not be satisfactory in the field of bus-bar jointing since the pressures required to cold flow lead solder would be such as to physically deform the aluminum bus-bar. Furthermore, it will be noted that in the NASA method the problem to be solved is directed to a relatively small contact area, whereas in a bus-bar joint, it is desirable to obtain electrical contact over as large an area as possible.

SUMMARY OF THE INVENTION

In the process of the present invention the contact surface of a bus-bar is coated with a low melting solder in such a manner that under ordinary operating conditions, that is to say under low load conditions, the mere clamping together of two bus-bars provides sufficient electrical contact. However, under high load conditions, under which the bus-bar will normally warm up, the solder will melt, flow across the entire surface of the joint by capillary action and thus form a complete and efficient electrical contact. As a result of this sudden and highly increased electrical contact, the total resistance of the bus-bar system drops, hence, the temperature will also fall whereupon the solder will freeze, yielding a joint which is highly satisfactory electrically and still possesses moderate mechanical strength. On the other hand, if the level of current in the bus-bar system is such that even the drop in resistance of the system caused by the aforementioned improved contact is not sufficient for the system to cool down to the extent necessary to freeze the solder, excellent electrical contact is still maintained since the capillary action of the adjacent bus-bar surfaces will be sufficient to maintain the solder as a film between them. Low mechanical strength is an advantage since on the one hand the mechanical juxtaposition of the members of the bus-bar system is not dependent solely upon the connecting joints and yet when it is desired to disassemble the system, upon unbolting, the surfaces may be readily pried apart with a prying tool and upon reassembling in the same or another system will, under high current conditions, again yield the desired soldered joint.

This so-called "auto soldering system" is highly desirable since under normal assembly conditions of a bus-bar system it is not practical to use conventional soldering means, neither is it desirable to weld together sections of the bus-bar system, since, as stated hereinabove, it is often necessary to have a system which may be readily disassembled.

There are other advantages pertaining to this bus-bar jointing system. As stated above, the efficiency of electrical contact in the conventional silver-to-silver system, is highly dependent upon the pressure applied by the jointing of bolts, thus, if a lock washer in a bolt set were to crack, relieving the pressure, the joint in the auto soldered system disclosed herein would be unimpaired electrically whereas this would not be the case in the conventional silver-to-silver system.

A further advantage of the system disclosed and claimed herein is immunity from corrosion since a flowed-on metal wets the parent metal surface in such a manner as to eliminate the porosity which is found with electrodeposited metals. Thus, there is no danger of corrosion due to electrochemical effect. However, if mechanical damage should occur in such a system which would give rise to an electrochemical effect, the damage would be greatly minimized since the total potential difference between the unlike metals would only be of the order of 0.5 volt rather than 2.5 volts with the silver system.

Yet another advantage of the system disclosed herein is that it is now possible to join a copper bus-bar to an aluminum bus-bar by a means which is substantially immune to electrolytic corrosion.

FIGURE 1 shows the results of comparative tests between bus joints produced by the method of the present invention and those produced by methods known heretofore. These tests show that the heat rise in bars 6–8, produced by the methods of the present invention was less at any given time than that in the bars produced by other methods. It is of interest to observe that in curve 6 the actual temperature drop upon fusion of the solder during the course of operation is shown. Details of the test procedure and nature of the bus-bar interface are given hereinbelow.

THE PREFERRED EMBODIMENTS

In the preferred embodiments of coating a bus-bar, the bus-bar is heated to a temperature of between 200 and 300° F., and the installation stripped therefrom in the usual manner. The exposed metal is then dipped into a suitable flux. Where the bus-bar is copper a flux, such as Nokorode, manufactured by The M. W. Dunton Co. of Providence, R. I., or the like is utilized or, where an aluminum bus-bar is to be coated, the exposed metal is dipped into a suitable aluminum flux, such as LA–CO aluminum flux (made by Lake Chemical Co.) or the like. The nature of the flux is not critical to the process of the present invention. Any flux may be employed which is compatible with the metal to be coated and the solder to be used. The time of dipping in the flux is not critcial, however, a time of between about 15 and about 60 seconds, suitably about 30 seconds, is preferred. The flux treated metal is then dipped into a bath of molten solder. Since the specifications of the NEMA permit a rise in temperature of a bus-bar of approximately 55° C. under operating conditions above ambient temperature, a solder should be chosen which melts approximately within this range. Thus, a suitable melting range would be from about 45° C. to about 100° C. Any solder composition which falls within this approximate temperature range may be employed in the process of this invention. However, it is desirable to exclude those low melting solders which include mercury in their composition. The reason for this exclusion is not inoperability, but rather that such solders at temperatures above their melting point give rise to mercury vapour, the presence of which is highly undesirable.

Among those solders suitable for the purposes of this invention are eutectic solders such as Cerrolow–117, Cerrolow–136, and Cerrobend which have a melting point of 47° C., 58° C., and 70° C. respectively, and compositions of 44.7% bismith, 22.6% leads, 8.3% tin, 5.3% cadmium, 19.1% indium; 49.0% bismuth, 18% lead, 12.0% tin, 21% indium; and 50% bismuth, 26.7% lead, 13.3% tin, and 10% cadmium; respectively. Among the suitable non-eutectic solders which may be employed are Cerrolow–147 and Cerrosafe, which have melting point ranges of 61° to 65° C. and 71° to 88° C. respectively, and compositions of 48% bismuth, 25.6% lead, 12.8% tin, 9.6% cadmium and 4.8% indium; and 42.5% bismuth, 37.7% lead, 11.3% tin, and 8.5% cadmium respectively. These examples are given for purposes of illustration only and not for purposes of limitation, since any soldering composition have a melting point within the ranges stated here and above is considered to be within the scope of the present invention.

The solder bath is heated to a temperature of between about 5° to 20° C. above its melting point. The flux coated metal bar is dipped into the solder for a period of between about 15 to about 60 seconds, preferably for about 30 seconds, withdrawn from the bath, and the excess solder removed, suitably by mechanical means. This coating process places on the exposed metal of the bus-bar a solder coating of between 0.0005 and 0.001 inch in thickness. Preferably about 0.0003 inch in thickness. While the depth of coating is not critical, this thickness range has been found suitable.

The solder coated bus-bar is then protected by coating it with any of the protective wax compositions known to the art for this purpose. A suitable method of protection is to dip the warm metal bar into molten wax, for a period of from about 15 to about 60 seconds, preferably for about 30 seconds. The nature of this coating is similar to that placed over the silver coated bus-bar joints as presently known to the art and in no way will hinder the conductive efficiency of the joint since, under operating conditions, it will either split off or melt away.

Under certain circumstances it may be desirable to coat the solder with a layer of metallic silver. This is done by dipping the solder coated joint into an aqueous solution of a silver salt suitably silver nitrate or silver cyanide, having a concentration in the range of 10 to 50 percent by weight of silver salt. The dipping time is from about 15 to about 60 seconds, suitably about 30 seconds. This silver coated joint is then wax coated as above. The silver coated joint operates in the same way as the uncoated solder joint since upon heating the thin coating layer of silver fuses into the solder coating.

This modification is utilized where job specifications unequivocably demand silver-to-silver surfaces in bus-bar systems.

In yet another modification of the present invention instead of coating the aluminum bus-bar with flux followed by molten solder, a paste may be prepared comprising the flux and finely-divided solder, which paste may be applied to the jointing surface of the bus-bar. When the bus-bar heats up in the course of operation, this paste of flux and solder will melt and join the two portions of the bus-bar joint together in the same manner as above. Although the invention is operable in this modification, it is preferred, for reasons of cleanliness in storage, to place a molten coat of solder onto the metallic surface of the bus-bar.

In yet another modification in the application of the low temperature solder, coatings have been applied without the use of a flux. This is accomplished by immersing the bus-bar at a temperature of preferably between 200° to 300° F. into any of the previously described solders which are held at between 5° to 20° C. above their melting points. The surface of the bus-bar is now vigorously abraded, while under the solder, with a stiff, glass bristle brush. This mechanically removes the oxide and allows the solder to deposit as a coating. This method is applicable to both copper and aluminum bus-bars and a coating thickness between .0003 and .0010 inch is obtained. This thickness is not critical. Suitable wax protection is dipped on to protect the surface in storage.

EXAMPLE I

A bus-bar is heated to approximately 300° F., and the insulation mechanically stripped from the end portion. The hot exposed metal is dipped into LA-CO aluminum flux for a period of 30 seconds, and then dipped into bath of molten metal having the composition 42.5% bismuth, 36.6% lead, 11.3% tin, 8.5% cadmium, and 1.1% silver. This bath is at a temperature of approximately 77° C., approximately 7° C. above the melting point of the composition. After 30 seconds the bus-bar is withdrawn from the liquid metal bath, wiped with a rag or brush, and dipped into a wax bath for approximately 30 seconds, withdrawn therefrom, and allowed to cool.

The bus-bar thus prepared may be jointed into a bus-bar system by bolting or similar conventional methods.

EXAMPLE II

Bus-bars were coated with coatings heretofore known and by methods first disclosed herein. The numbers designating the coatings correspond to the numbers of the curves plotted in FIG. I.

Prior art coatings

Curve 1—Vaccum deposited silver.
Curve 2—Joint of aluminum bus-bar bolted bare with no surface preparation.
Curve 3—Chemically deposited silver (extremely thin, .00005").
Curve 4—Copper bus-bar silver plated current production method.
Curve 5—Aluminum bus-bar silver plated current production method (Zincate).

Novel

Curve 6—Copper bus-bar coated with low temperature solder. Cerrobend with melting point of 70° C.
Curve 7—Aluminum bus-bar coated with low temperature solder. Cerrobend with melting point of 70° C.
Curve 8—Aluminum bus-bar coated with low temperature solder. Cerrolow with melting point 58° C. Composition is 49% bismuth, 18% lead, 12% tin and 21% indium. This was coated upon the aluminum by abrading the heated bus-bar under the surface of the molten solder with a glass bristle brush thus avoiding the use of a flux.

The dashed line 10 indicates the maximum permissible temperature for a bus-bar joint.

The test procedure was carried out as follows:

Seven pieces of round end bus ¼" x 2" x 2½" are used for each test. These are stacked alternately so that a 4 square inch area is in contact. This makes six interfaces which the current must flow through in series and in the same pile. The seven pieces are clamped with a C-clamp 11 tightened to over the minimum critical pressure which can readily be obtained by watching the ammeter while applying pressure. The C-clamp 11 is insulated from the stack 20 by means of insulating pads 12 so it does not act as a shunt. A thermocouple 13 is insulated, is buried in the center sample of the stack 20 to a depth of ¾" and readings on potentiometer 14 are taken at standard intervals and plotted on a curve, time versus temperature while holding current constant at 400 amperes. See FIG. 2. The current is controlled by variable transformer 15 and lead to the stack 20 via transformer 16.

The embodiments of the invention in which an exclusive privilege or property is claimed are defined as follows:

1. A process for improving the electrical conductivity of a bus-bar joint, which comprises the steps of
    (a) coating the metal bus-bar surface to be jointed by dipping same into a molten flux material,
    (b) coating the flux coated metal with a solder by dipping it into a bath of molten solder, said solder having a melting point between 45° C. and about 100° C.,
    (c) silver coating the solder coated surface by dipping it into an aqueous solution of silver salt; and
    (d) bolting together two or more bus-bars having contacting surfaces coated in the manner of steps (a), (b), and (c) herein.

2. The process of claim 1 wherein the bus-bar is made of copper.

3. The process of claim 1 wherein the bus-bar is made of aluminum.

References Cited

UNITED STATES PATENTS

| | | |
|---|---|---|
| 2,914,640 | 11/1959 | Grattidge. |
| 3,074,158 | 1/1963 | Finnegan _____ 29—49 |
| 3,226,608 | 12/1965 | Coffin _____ 174—94 XR |

JOHN F. CAMPBELL, Primary Examiner

R. W. CHURCH, Assistant Examiner

U.S. Cl. X.R.

29—495, 498, 502, 527, 593, 629; 117—114; 174—74, 75, 94; 339—275